United States Patent
Kume et al.

(10) Patent No.: US 12,392,635 B2
(45) Date of Patent: Aug. 19, 2025

(54) SELF-POSITION ESTIMATION DEVICE, SELF-DRIVING SYSTEM INCLUDING THE SAME, AND SELF-GENERATED MAP SHARING DEVICE

(71) Applicant: Hitachi Astemo, Ltd., Ibaraki (JP)

(72) Inventors: Hideyuki Kume, Tokyo (JP); Alex Masuo Kaneko, Tokyo (JP); Toshiharu Sugawara, Tokyo (JP); Akira Kuriyama, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 170 days.

(21) Appl. No.: 17/437,316

(22) PCT Filed: Feb. 7, 2020

(86) PCT No.: PCT/JP2020/004729
§ 371 (c)(1),
(2) Date: Sep. 8, 2021

(87) PCT Pub. No.: WO2020/189079
PCT Pub. Date: Sep. 24, 2020

(65) Prior Publication Data
US 2022/0178717 A1    Jun. 9, 2022

(30) Foreign Application Priority Data
Mar. 15, 2019 (JP) .................. 2019-047903

(51) Int. Cl.
*G01C 21/00* (2006.01)
*B60W 60/00* (2020.01)
(Continued)

(52) U.S. Cl.
CPC ....... *G01C 21/3815* (2020.08); *B60W 60/001* (2020.02); *G01C 21/3461* (2013.01);
(Continued)

(58) Field of Classification Search
CPC ......... G01C 21/38–3896; G01C 21/00; B60W 60/00; G05D 1/0088; G05D 1/00
(Continued)

(56) References Cited

U.S. PATENT DOCUMENTS 9,157,749 B2    10/2015    Aoki et al.
2009/0265070 A1  10/2009   Okada et al.
(Continued)

FOREIGN PATENT DOCUMENTS

CA    2968561 A1 *   4/2014   ............. G01C 21/20
JP    08-247775 A      9/1996
(Continued)

OTHER PUBLICATIONS

Aihara K—English description of WO-2019176798-A1 via Espacenet Patent Translate, retrieved Apr. 21, 2023. (Year: 2023).*
(Continued)

*Primary Examiner* — Ruth Ilan
*Assistant Examiner* — Paul Allen
(74) *Attorney, Agent, or Firm* — Volpe Koenig

(57) ABSTRACT

An object is to provide a self-position estimation device capable of highly accurately estimating self-location and attitudes on a map containing information such as lane centerlines, stop lines, and traffic rules. A representative self-position estimation device according to the present invention includes a self-position estimation portion that estimates a self-location and attitude on a high-precision map from measurement results of a sensor to measure objects around a vehicle; a low-precision section detection portion that detects a low-precision section indicating low estimation accuracy based on the self-location and attitude estimated by the self-position estimation portion; and a self-map generation portion that generates a self-generated map saving a position and type of the object on the high-
(Continued)

precision map in the low-precision section detected by the low-precision section detection portion.

16 Claims, 10 Drawing Sheets

(51) Int. Cl.
  *G01C 21/34* (2006.01)
  *G08G 1/0962* (2006.01)
(52) U.S. Cl.
  CPC ..... *G08G 1/09626* (2013.01); *B60W 2556/40* (2020.02); *B60W 2556/45* (2020.02); *B60W 2710/20* (2013.01); *B60W 2720/10* (2013.01); *G01C 21/3453* (2013.01); *G01C 21/3841* (2020.08)
(58) Field of Classification Search
  USPC ...................................... 701/23–28, 400–541
  See application file for complete search history.

(56) References Cited

U.S. PATENT DOCUMENTS

| | | |
|---|---|---|
| 2011/0044543 A1 | 2/2011 | Nakamura et al. |
| 2013/0253753 A1* | 9/2013 | Burnette ............. G06V 10/145 382/104 |
| 2013/0261968 A1* | 10/2013 | Sakairi .................. G01C 21/34 707/736 |
| 2016/0282127 A1 | 9/2016 | Goto et al. |
| 2017/0097241 A1* | 4/2017 | Prokhorov ........... G05D 1/0088 |
| 2018/0059674 A1* | 3/2018 | Kunisa ................. G05D 1/0246 |
| 2018/0066960 A1* | 3/2018 | Tateishi ............. G01C 21/3461 |
| 2018/0189601 A1* | 7/2018 | Dabeer .............. G01C 21/3867 |
| 2019/0072399 A1 | 3/2019 | Sakai et al. |
| 2019/0323855 A1* | 10/2019 | Mahler ................. G01S 17/931 |
| 2020/0090375 A1* | 3/2020 | Mori ...................... G02B 27/01 |
| 2020/0201899 A1* | 6/2020 | Lin .................... G01C 21/3819 |
| 2020/0247369 A1* | 8/2020 | Ahnfalk ............. B60W 50/085 |
| 2020/0292331 A1* | 9/2020 | Rabel .................... G06F 16/909 |
| 2021/0348937 A1* | 11/2021 | Kageyama ........... G01C 21/367 |
| 2022/0005332 A1* | 1/2022 | Metzler ............. G08B 13/1968 |

FOREIGN PATENT DOCUMENTS

| | | |
|---|---|---|
| JP | 2007-305079 A | 11/2007 |
| JP | 2008-299650 A | 12/2008 |
| JP | 2009-149194 A | 7/2009 |
| JP | 2016-180980 A | 10/2016 |
| WO | 2012/141199 A1 | 10/2012 |
| WO | 2017/130419 A1 | 8/2017 |
| WO | WO-2019176798 A1 * | 9/2019 |

OTHER PUBLICATIONS

Joseph Redmon, Santosh Divvala, Ross Girshick, Ali Farhadi, You Only Look Once: Unified, Real-Time Object Detection, IEEE Conference on Computer Vision and Pattern Recognition, 2016, pp. 779-788.

M.A. Fischler and R.C. Bolles, Random Sample Consensus: A Paradigm for Model Fitting with Applications to Image Analysis and Automated Cartography, Communications of the ACM, vol. 24, No. 6, pp. 3 81-395, 1981.

International Search Report, PCT/JP2020/004729, dated Jun. 2, 2020, 2 pgs.

Japanese Office Action issued on Nov. 1, 2022 for Japanese Patent Application No. 2019-047903.

* cited by examiner

TIME $t_1$

TIME $t_2$

FIG. 5

| TIME | THREE-DIMENSIONAL POSITION AGAINST SENSOR | OBJECT TYPE |
|---|---|---|
| $t_1$ | −10, 30, 10 | BUILDING |
| $t_1$ | 15, 35, 5 | UTILITY POLE |
| $t_2$ | −10, 25, 10 | BUILDING |
| $t_2$ | 15, 30, 5 | UTILITY POLE |
| $t_2$ | −10, 35, 3 | TREE |
| ... | ... | ... |

FIG. 6

| THREE-DIMENSIONAL POSITION IN COORDINATE SYSTEM OF HIGH-PRECISION MAP | OBJECT TYPE | MEASUREMENT DATE AND TIME |
|---|---|---|
| 5, 35, 10 | BUILDING | 2018/12/28 12:00 |
| 30, 40, 5 | UTILITY POLE | 2018/12/28 12:00 |
| 5, 45, 3 | TREE | 2018/12/28 12:01 |
| ... | ... | ... |

FIG. 7

| OBJECT TYPE | AVAILABILITY LIMIT |
|---|---|
| BUILDING | 180 DAYS |
| UTILITY POLE | 180 DAYS |
| TREE | 15 DAYS |
| ... | ... |

SELF-POSITION ESTIMATION DEVICE, SELF-DRIVING SYSTEM INCLUDING THE SAME, AND SELF-GENERATED MAP SHARING DEVICE

TECHNICAL FIELD

The present invention relates to a self-position estimation device, a self-driving system including the same, and a self-generated map sharing device.

BACKGROUND ART

The self-driving system requires improving the estimation accuracy of subject-vehicle positioning attitudes on a high-precision map to acquire information important for planning and determination of automated driving from the high-precision map. Such information includes lane centerlines, stop lines, and traffic rules, for example. Generally, GNSS (Global Navigation Satellite System) is widely used to estimate subject-vehicle positioning attitudes on a map. However, GNSS receivers capable of highly accurately estimating subject-vehicle positioning attitudes are expensive. The estimation accuracy decreases in environments, such as in tunnels or near buildings, where radio waves from artificial satellites are shielded or reflected.

Concerning this issue, for example, claim 1 of patent literature 1 contains the description such as "a tracking system in which a succeeding vehicle performs tracking based on information provided by a preceding vehicle, wherein the preceding vehicle includes an environmental information acquisition means for acquiring surrounding environmental information, an environmental map generation means for generating an environmental map based on the environmental information, self-location and attitude, and a communication means for transmitting the environment map; and the succeeding vehicle includes a communication means for receiving the environment map generated by the preceding vehicle, an environmental information acquisition means for acquiring surrounding environmental information, a map collation means for estimating self-location and attitude by collating environmental information acquired by the environmental information acquisition means with an environment map generated by the preceding vehicle, and a location-attitude determining means for determining a final self-position and attitude by referencing a self-position and attitude estimated by the map collation means." Paragraph 0002 in the same literature assumes that a driver drives the preceding vehicle that generates the environmental map.

CITATION LIST

Patent Literature

Patent Literature 1: Japanese Unexamined Patent Application Publication No. 2009-149194

SUMMARY OF INVENTION

Technical Problem

According to patent literature 1, the succeeding vehicle estimates subject-vehicle positioning attitudes on the map (environmental map) generated by the preceding vehicle, thus providing automated driving by performing tracking without using an expensive high-precision GNSS receiver. However, the map generated by the preceding vehicle does not contain information such as lane centerlines, stop lines, and traffic rules, making it difficult for the succeeding vehicle to provide automated driving except tracking driving.

It is an object of the present invention to provide a self-position estimation device capable of improving the accuracy of estimating subject-vehicle positioning attitudes on a high-precision map that contains information such as lane centerlines, stop lines, and traffic rules, without the use of a preceding vehicle driven by a driver or an expensive precision GNSS receiver.

Solution to Problem

A representative self-position estimation device according to the present invention includes a self-position estimation portion that estimates a self-location and attitude on a high-precision map from measurement results of a sensor to measure objects around a vehicle; a low-precision section detection portion that detects a low-precision section indicating low estimation accuracy based on the self-location and attitude estimated by the self-position estimation portion; and a self-map generation portion that generates a self-generated map saving a position and type of the object on the high-precision map in the low-precision section detected by the low-precision section detection portion.

Advantageous Effects of Invention

The self-position estimation device according to the present invention can improve the accuracy of estimating subject-vehicle positioning attitudes on a high-precision map that contains information such as lane centerlines, stop lines, and traffic rules, without the use of a preceding vehicle driven by a driver or an expensive precision GNSS receiver.

BRIEF DESCRIPTION OF DRAWINGS

FIG. 5 illustrates past feature data;

FIG. 6 illustrates a self-generated map;

FIG. 7 illustrates availability limits according to object types;

DESCRIPTION OF EMBODIMENTS

Embodiments of the present disclosure will be described by reference to the accompanying drawings.

First Embodiment

The description below explains a self-position estimation device 1 according to the first embodiment of the present invention by reference to FIGS. 1 to 9.

Block Configuration

Figure 1:
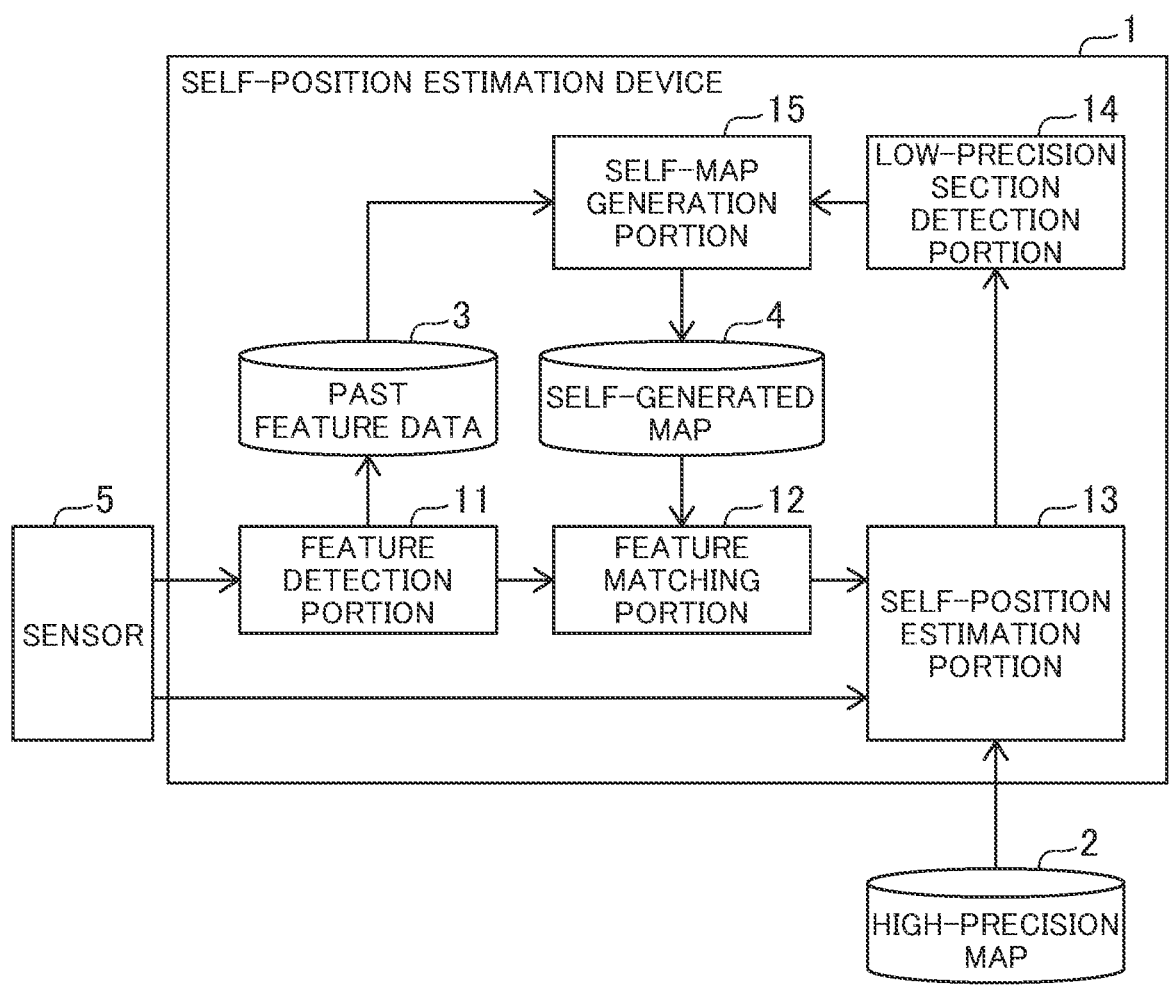
FIG. 1 is a block diagram illustrating a self-position estimation device according to a first embodiment.

FIG. 1 is a diagram illustrating a block configuration of a self-position estimation device 1 according to the present embodiment. The self-position estimation device 1 is practically a calculator including hardware such as an arithmetic device such as CPU, the main storage device such as semiconductor memory, an auxiliary storage device, and a communication device, for example. The arithmetic device provides functions described later by executing a program loaded in the main storage device while referencing a database recorded in the auxiliary storage device. The description below omits the well-known technologies in the field of calculators as needed.

As illustrated in FIG. 1, the self-position estimation device 1 includes a feature detection portion 11, a feature matching portion 12, a self-position estimation portion 13, a low-precision section detection portion 14, and a self-map generation portion 15 and maintains past feature data 3 and a self-generated map 4. The self-position estimation device 1 is supplied with measurement results of a sensor 5 and a high-precision map 2 from a higher-order system. The description below assumes a configuration that successively acquires regions around the subject vehicle in the high-precision map 2 containing a large amount of data from the outside. However, there may be a configuration where the self-position estimation device 1 maintains the whole of the high-precision map 2.

The sensor 5 is installed in subject vehicle $V_0$ and measures the environment around subject vehicle $V_0$. For example, the sensor 5 is available as a monocular camera, a stereo camera, a LiDAR, a millimeter-wave radar, or a sonar, and measures three-dimensional positions of objects existing around subject vehicle $V_0$. When a monocular camera is used, acquired data is image I and makes it impossible to directly measure three-dimensional positions of surrounding objects. However, three-dimensional positions can be measured through the use of multiple images I based on a known motion stereo method, for example. A stereo camera can detect three-dimensional information and information such as lanes and stop lines necessary for planning and determination in automated driving from image I.

Unless otherwise specified, the description below assumes that the sensor 5 represents a stereo camera installed in a vehicle facing toward the front and provides measurement results as image I. However, the sensor 5 is not limited to stereo cameras and may be available as a combination of multiple sensors including other sensors or a monocular camera and a LiDAR instrument. The sensor 5 may use a sensor to measure states of subject vehicle $V_0$ in addition to the sensor to measure the environment around subject vehicle $V_0$. For example, it may be favorable to use a GNSS, compass, or gyroscope capable of measuring subject-vehicle positioning attitude x in the high-precision map 2.

It may be also favorable to use a sensor that acquires information such as subject-vehicle positioning attitude x by communicating with a beacon installed on the road, for example.

The feature detection portion 11 detects characteristic information not included in the high-precision map 2 from a measurement result of the sensor 5 and saves the information as the past feature data 3. The feature matching portion 12 associates features detected by the feature detection portion 11 with features stored in the self-generated map 4. The self-position estimation portion 13 estimates subject-vehicle positioning attitude x based on the measurement result from the sensor 5 and the feature matching result from the feature matching portion 12. The low-precision section detection portion 14 detects a section causing the low accuracy of estimating subject-vehicle positioning attitude x based on subject-vehicle positioning attitude x estimated by the self-position estimation portion 13. The self-map generation portion 15 generates the self-generated map 4 for the section that causes the low accuracy of estimating subject-vehicle positioning attitude x and is detected by the low-precision section detection portion 14, based on the past feature data 3 and the subject-vehicle positioning attitude x estimated by the self-position estimation portion 13.

Figure 2:
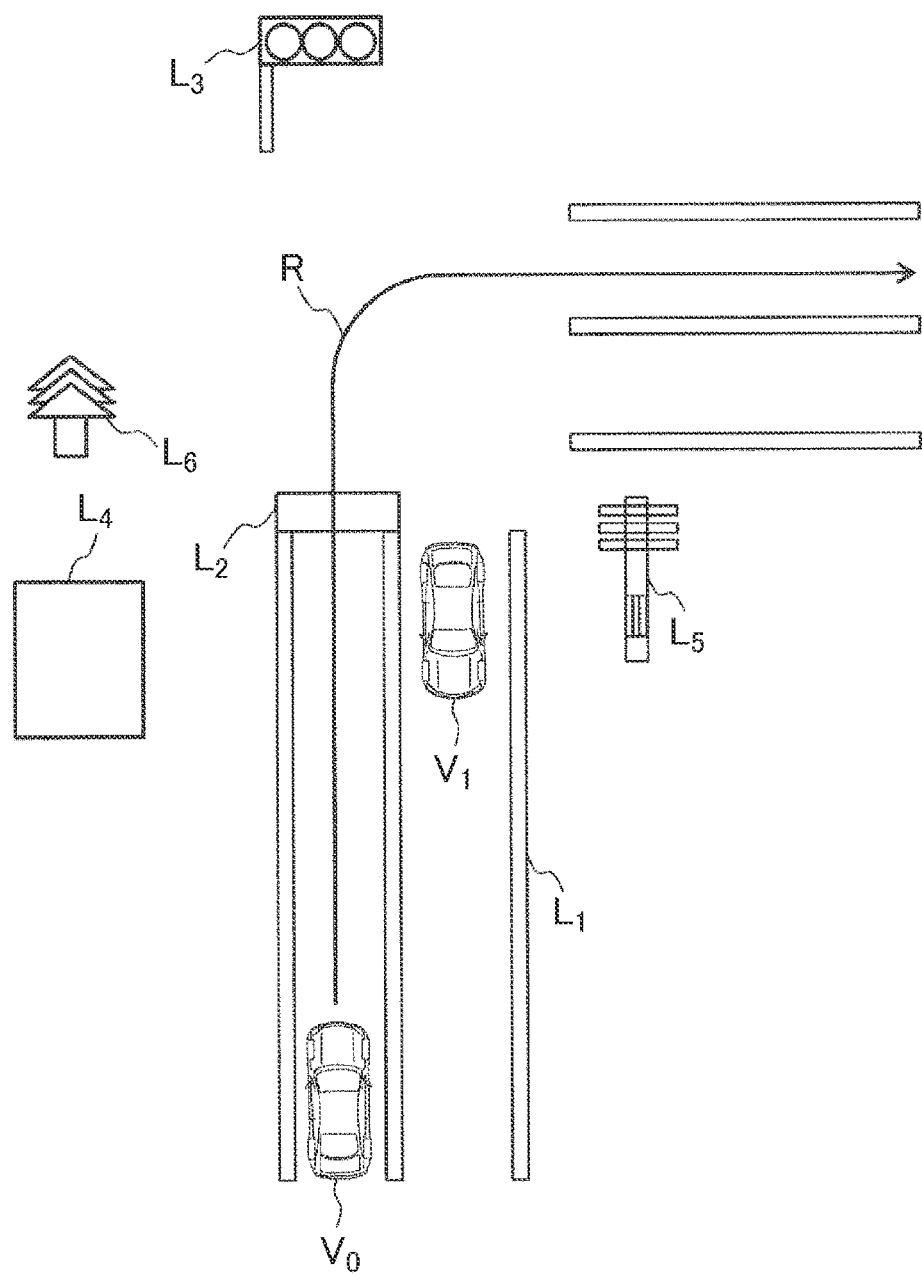
FIG. 2 illustrates an example of the surrounding environment of a subject vehicle.

FIG. 2 illustrates an environment around subject vehicle $V_0$ equipped with the self-position estimation device 1. In the drawing, subject vehicle $V_0$ is going to enter an intersection and is close to surroundings including another vehicle $V_1$ in addition to landmarks such as lane $L_1$, stop line $L_2$, traffic light $L_3$, building $L_4$, utility pole $L_5$, and tree $L_6$. The self-driving system installed in subject vehicle $V_0$ calculates route R to a target point based on the surrounding result measured by the sensor 5 mounted on subject vehicle $V_0$, the surrounding information about subject vehicle $V_0$ acquired from the high-precision map 2 through the use of subject-vehicle positioning attitude x estimated by self-position estimation device 1, and information on the target point preset in the self-driving system, allowing subject vehicle $V_0$ to automatically drive along route R. The example of FIG. 2 calculates route R that turns right at the intersection.

Figure 3:
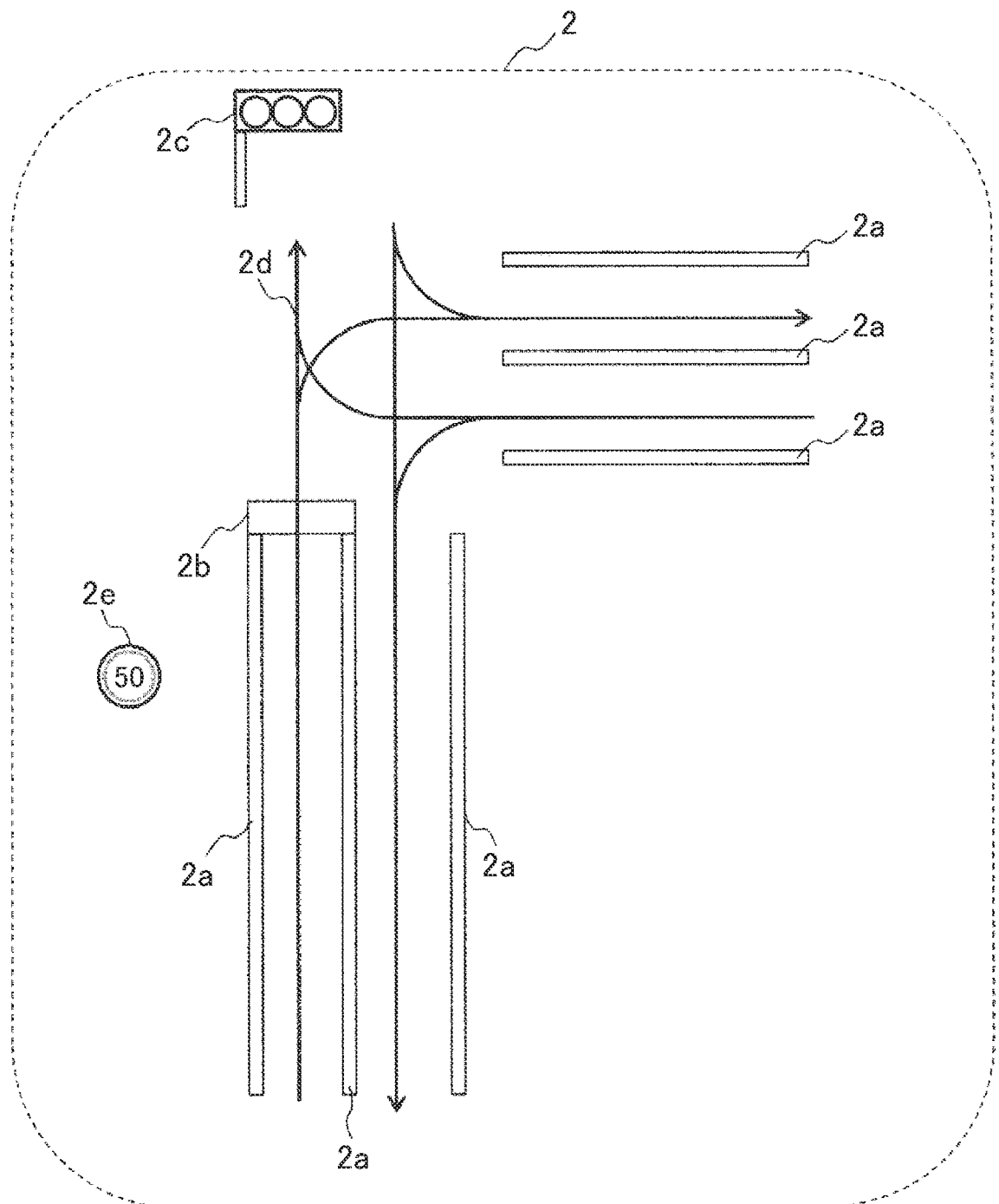
FIG. 3 illustrates a high-precision map.

FIG. 3 is an example of the high-precision map 2 and illustrates the high-precision map 2 at the location illustrated in FIG. 2. The high-precision map 2 contains the information necessary for planning and determination on automated driving such as positions of white line 2a, stop line 2b, traffic light 2c, and lane centerline 2d, and a traffic rule such as speed limit 2e (such as 50 km/h). The self-position estimation device 1 estimates subject-vehicle positioning attitude x on the high-precision map 2, making it possible to acquire the landmark information and the traffic rule information around subject vehicle $V_0$ from the high-precision map 2.

Operations of the Feature Detection Portion 11

The description below explains the contents of processes in the feature detection portion 11 through the use of FIGS. 4A, 4B, and 5.

The feature detection portion 11 detects characteristic information from the measurement results generated by the sensor 5 and saves the information as the past feature data 3. For example, the feature detection portion 11 applies a known object recognition method to the data acquired from the sensor 5, detects objects such as utility poles, buildings, and trees, and saves a combination of object types and 3D positions as the past feature data 3.

When the sensor 5 is a monocular camera or a stereo camera, objects can be recognized from image I through the use of "Joseph Redmon, Santosh Divvala, Ross Girshick, Ali Farhadi, You Only Look On ce: Unified, Real-Time Object Detection, IEEE Conference on Computer Vision and Pattern Recognition, 2016, pp. 779-788," for example. This technique may be replaced by a known method for detecting objects from image I and 3D information when using a combination of the camera and a sensor that can directly measure 3D information as the sensor 5.

Figure 4A:
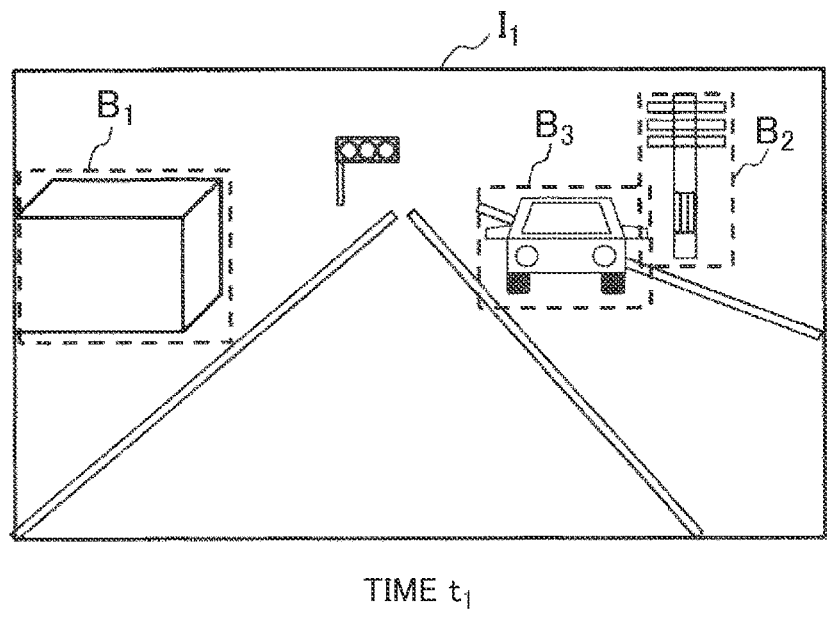
FIG. 4A illustrates a feature detection result ahead of the subject vehicle at time $t_1$.
Figure 4B:
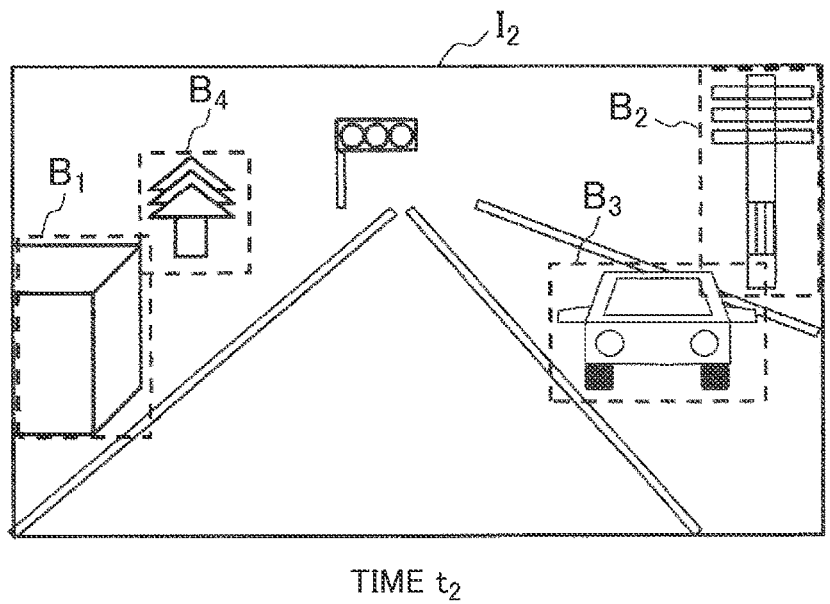
FIG. 4B illustrates a feature detection result ahead of the subject vehicle at time $t_2$.

FIG. 4A and FIG. 4B are diagrams illustrating results of detecting features from the feature detection portion 11. FIG. 4A is image $I_1$ captured at a given time $t_1$. Building $B_1$, utility pole $B_2$, and car $B_3$ are detected from this image. FIG. 4B is an image $I_2$ captured at time $t_2$ when subject vehicle $V_0$ advances a predetermined distance. In this image, tree $B_4$ is detected in addition to $B_1$ to $B_3$ above.

FIG. 5 illustrates the past feature data 3 saved by the feature detection portion 11. As illustrated in the drawing, the past feature data 3 saves information such as "time," "three-dimensional position against the sensor," and "object type." For example, the past feature data 3 for FIG. 4A and FIG. 4B saves the three-dimensional positions measured by the sensor 5 and the corresponding object types of building $B_1$ and utility pole $B_2$ detected at time $t_1$. Similarly, building $B_1$ and utility pole $B_2$ are detected at time $t_2$ to save the three-dimensional positions varying with the advance of subject vehicle $V_0$. At time $t_2$, subject vehicle $V_0$ advances to detect tree $B_4$ not detected at time $t_1$. Therefore, the past feature data 3 also saves information about tree $B_4$. For example, the "three-dimensional position against the sensor" signifies the position of the center or the center of gravity of each object based on the position of the sensor 5 as a reference point.

It is favorable to exclude moving objects from the past feature data 3 because the past feature data 3 is used to generate the self-generated map 4 in the self-map generation portion 15 described later. Therefore, the feature detection portion 11 does not save the 3D position of a moving object in the past feature data 3 even if the moving object is detected from data acquired from the sensor 5. A known method for detecting moving objects can be used to determine moving objects by comparing the object data acquired at different times. Alternatively, the object type may be used to determine moving objects. For example, in FIG. 4A and FIG. 4B, the oncoming vehicle is detected as car $B_3$. However, in FIG. 5, car $B_3$ is not saved as the past feature data 3 because cars are highly likely to be moving objects.

As above, FIG. 5 illustrates the example where the feature detection portion 11 saves an object detected by the object recognition technology as a feature. However, operations of the feature detection portion 11 are not limited thereto. For example, the feature detection portion 11 may save all three-dimensional positions acquired from the sensor 5 as a group of three-dimensional points in the past feature data 3. In FIG. 5, one three-dimensional position is stored for one object. However, for example, all three-dimensional positions measured on one object may be saved for that object. The feature detection portion 11 may store information such as texture information to be used for the feature matching portion 12 described later in addition to the three-dimensional positions and object types.

Operations of the Feature Matching Portion 12

The description below explains the contents of processes in the feature matching portion 12 through the use of FIGS. 6 and 7. The feature matching portion 12 associates features detected by the feature detection portion 11 with features stored in the self-generated map 4.

FIG. 6 is a diagram illustrating the self-generated map 4. As illustrated in the diagram, the self-generated map 4 saves information such as "three-dimensional position in the coordinate system of the high-precision map," "object type," and "measurement date and time." The self-map generation portion 15 generates the self-generated map 4. The generation method will be described later.

For example, the feature matching portion 12 can use the following method. For each feature type, the method converts the relative position of a feature detected by the feature detection portion 11 from the sensor 5 into the position on the high-precision map 2 using the position of subject vehicle $V_0$ on the high-precision map 2 estimated by the self-position estimation portion 13 one period ago. The method assumes the most closely positioned feature included in the self-generated map 4 to be the targeted feature. The past feature data 3 may save information for the association such as texture information. In such a case, the information may be used for the association.

The feature matching portion 12 may select features used for the association based on availability limits corresponding to the predetermined object types. FIG. 7 is a diagram illustrating availability limits corresponding to the object types. The availability limits are configured to be long for objects such as buildings and utility poles that are considered to cause small time changes. The availability limits are configured to be short for objects such as trees that are considered to cause large time changes. The feature matching portion 12 thereby uses only the object for the association when a difference between the measurement date and time saved in the self-generated map 4 for that object and the current date and time is shorter than or equal to the availability limit.

Operations of the Self-Position Estimation Portion 13

The description below explains the contents of processes in the self-position estimation portion 13. The self-position estimation portion 13 estimates subject-vehicle positioning attitude x based on the measurement result from the sensor 5 and the feature matching result from the feature matching portion 12. There is no feature matching result in a section where the self-generated map 4 does not exist. In such a section, the self-position estimation portion 13 estimates subject-vehicle positioning attitude x only based on the measurement result from the sensor 5.

Various known techniques can be used to estimate subject-vehicle positioning attitude x using measurement results from the sensor 5. One example is to detect landmarks such as white line $2a$, stop line $2b$, and traffic light $2c$ included in the high-precision map 2 from the measurement results of the sensor 5. The detected landmarks are associated with the landmarks on the high-precision map 2, making it possible to estimate subject-vehicle positioning attitude x on the high-precision map 2. When a monocular camera or a stereo camera is used as the sensor 5, for example, landmarks can be detected through the use of the technique described in Japanese Unexamined Patent Application Publication No. 2009-139306 for detecting landmarks from images. An available method for associating landmarks converts the position of a landmark detected by the sensor based on each landmark type into the position on the high-precision map 2 by using the position of subject vehicle $V_0$ estimated on the high-precision map 2 one period ago in the self-position estimation portion 13. The targeted landmark can be identified by selecting a land mark that belongs to landmarks included in the high-precision map 2 and indicates the closest position.

The technique based on the above-mentioned landmark detection and association may be used to estimate subject-vehicle positioning attitude x using measurement results from the sensor 5. In this case, the self-position estimation portion 13 estimates current subject-vehicle positioning attitude x by using equation 1 below.

[Math 1]

$$\underset{x}{\operatorname{argmin}}\left(\sum_{i\in L}\omega_{li}|d(l_i, l'_i(x))|^2 + \sum_{i\in F}\omega_{fi}|d(f_i, f'_i(x))|^2\right) \quad (1)$$

where L denotes a set of associated landmarks; $l_i$ the position of a landmark on the high-precision map 2; $l'_i(x)$ the position of a detected landmark in which the position is converted to the position on the high-precision map 2 based on subject-vehicle positioning attitude x; F a set of features associated by the feature matching portion 12; $f_i$ the feature position on the self-generated map 4; and $f'_i(x)$ the position of a feature detected by the feature detection portion 11 in which the position is converted to the position on the self-generated map 4 based on subject-vehicle positioning attitude x. Moreover, $\omega_{li}$ and $\omega_{fi}$ denote weights, and d(a, a') denotes a distance between a and a'. When a and a' denote points in three-dimensional space, d(a, a') denotes a distance between the two points. When a and a' are represented as lines in the three-dimensional space, for example, place sampling points on one line at regular intervals and draw perpendicular lines from the sampling points to the other line. Lengths of the perpendicular lines are averaged and the average length is defined as the distance.

The optimization of equation 1 may use a known incorrect association removal method to eliminate an incorrect association included in the landmark association or the feature association in the feature matching portion 12. It is possible to eliminate incorrect associations based on random sampling by using M. A. Fischler and R. C. Bolles, Random Sample Consensus: A Paradigm for Model Fitting with Applications to Image Analysis and Automated Cartography, Communications of the ACM, vol. 24, no. 6, pp. 381-395, 1981, for example.

The sensor 5 may represent a sensor such as a GNSS or a beacon installed on a road capable of measuring subject-vehicle positioning attitude x. In this case, the self-position estimation portion 13 estimates the current subject-vehicle positioning attitude x by using equation 2 below.

[Math 2]

$$\underset{x}{\operatorname{argmin}}\left(\omega_x d(x, x_s)^2 + \sum_{i\in F}\omega_{fi}|d(f_i, f'_i(x))|^2\right) \quad (2)$$

where $x_s$ denotes the subject-vehicle positioning attitude measured by the GNSS or the beacon on the high-precision map 2 and $\omega_x$ denotes the weight.

Operations of the Low-Precision Section Detection Portion 14

The description below explains the contents of processes in the low-precision section detection portion 14 through the use of FIG. 8. The low-precision section detection portion 14 detects a section causing the low accuracy of estimating subject-vehicle positioning attitude x based on subject-vehicle positioning attitude x estimated by the self-position estimation portion 13.

Figure 8:
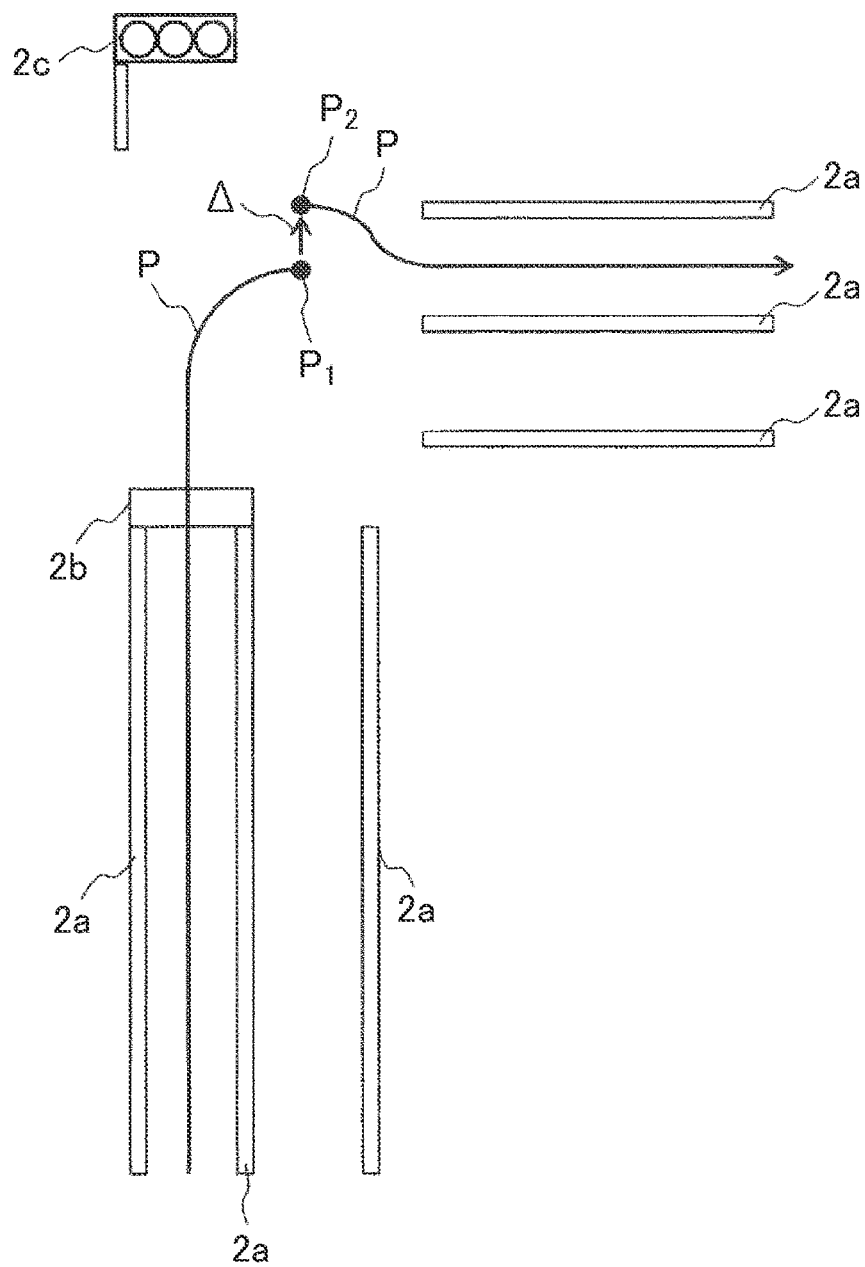
FIG. 8 illustrates a subject vehicle position on a high-precision map estimated by the self-position estimation portion.

FIG. 8 is a diagram illustrating subject vehicle position P on the high-precision map 2 estimated by the self-position estimation portion 13. This example shows a situation where estimated subject vehicle position P is discontinuous due to an excessively large distance Δ between subject vehicle position $P_1$ at time $t_1$ and subject vehicle position $P_2$ at time $t_2$ immediately after $t_1$ as a result of estimating subject vehicle position P in the environment illustrated in FIG. 2 based on the association between the landmarks and the high-precision map 2 illustrated in FIG. 3. The discontinuity occurs for the following reason. An error of subject vehicle position P could not be corrected before time $t_1$ as a result of unsuccessful detection of the stop line 2b. After time $t_2$, however, subject vehicle position P is corrected based on the associating with the white line 2a detected after turning to the right, increasing the estimation accuracy.

The low-precision section detection portion 14 can detect the section before time $t_1$ as a low-precision section when the distance Δ between subject vehicle positions $P_1$ and $P_2$ at time $t_1$ and $t_2$ is greater than or equal to a predetermined threshold value.

Operations of the Self-Map Generation Portion 15

The description below explains the contents of processes in the self-map generation portion 15 through the use of FIG. 9. The self-map generation portion 15 generates the self-generated map 4 in the low-precision section detected by the low-precision section detection portion 14 based on the past feature data 3 and subject-vehicle positioning attitude x estimated by the self-position estimation portion 13. The self-map generation portion 15 need not generate the self-generated map 4 in real-time and may perform the map generation process at the timing when the calculator is lightly loaded. According to the present embodiment, the generation of the self-generated map 4 in the self-map generation portion 15 conceptually includes not only a process to newly generate the self-generated map 4 but also a process to modify the contents of the existing self-generated map 4 and high-precision map 2.

The process of the self-map generation portion 15 consists of a process to estimate past subject-vehicle positioning attitude x' and a process to place feature data on the map.

During the process to estimate past subject-vehicle positioning attitude x', the self-map generation portion 15 estimates subject-vehicle positioning attitude x' used to measure the past feature data 3 from the past feature data 3 and subject-vehicle positioning attitude x estimated by the self-position estimation portion 13. FIG. 9 is a diagram illustrating past subject vehicle position P' specified from the past subject-vehicle positioning attitude x' estimated by the self-map generation portion 15. Various methods can be used to estimate past subject-vehicle positioning attitude x'. For example, it may be favorable to estimate subject-vehicle positioning attitude x' at any time T before time $t_1$ using equation 3 below.

[Math 3]

$$x'_T = x_T + (x_{t2} - x_{t1}) \quad (3)$$

where $x'_T$ denotes the subject-vehicle positioning attitude at time T estimated by the self-map generation portion 15; and $x_T$, $x_{t1}$, and $x_{t2}$ the subject-vehicle positioning attitudes at time T, $t_1$, and $t_2$ estimated by the self-position estimation portion 13.

A known method may be used to estimate past subject-vehicle positioning attitude x' based on the past feature data 3 by estimating subject-vehicle positioning attitude x' at the time before the time $t_1$ relative to subject-vehicle positioning attitude x at time $t_2$. For example, it is possible to use the Structure-from-Motion method that estimates, from an image, the relative position attitude of a camera when capturing the image. The past subject-vehicle positioning attitude x' is estimated from the estimated relative subject-vehicle positioning attitude by using equation 4 below.

[Math 4]

$$x'_T = y_{t2,T} + x_{t2} \quad (4)$$

where $y_{t2,T}$ denotes the relative subject-vehicle positioning attitude at time T to subject-vehicle positioning attitude x at time $t_2$ estimated from the past feature data 3. Past subject-vehicle positioning attitude x' can be more highly accurately estimated through the use of the method capable of highly accurately estimating the relative subject-vehicle positioning attitude despite the need for calculation time rather than the method the self-position estimation portion 13 uses to estimate subject-vehicle positioning attitudes.

During the process to place feature data on the map, the self-map generation portion 15 places the feature data in the same coordinate system as the high-precision map 2 from the estimated past subject-vehicle positioning attitude x' and the past feature data 3 to generate or update the self-generated map 4. FIG. 6 is a diagram illustrating the self-generated map 4. The three-dimensional position ceiling the sensor 5 stored in the past feature data 3 is converted to a three-dimensional position on the high-precision map 2 based on the estimated past subject-vehicle positioning attitude x' and is saved along with the object type. As illustrated in FIG. 5, the same object is measured at different times in the past feature data 3. Data indicating the same object type and close positions on the high-precision map 2 may be collected as one object by saving an average of multiple three-dimensional positions, for example. The self-generated map 4 also saves the date and time when each object was measured.

Effects

The above-described self-position estimation device 1 according to the first embodiment can provide the following effects.

(1) The self-position estimation device 1 includes the feature detection portion 11, the feature matching portion 12, the self-position estimation portion 13, the low-precision section detection portion 14, and the self-map generation portion 15. The feature detection portion 11 detects characteristic information from the measurement results of the sensor 5 to measure the surrounding environment of subject vehicle $V_O$ and saves the information as the past feature data 3. The feature matching portion 12 associates features detected by the feature detection portion 11 with features stored in the self-generated map 4. The self-position estimation portion 13 estimates the subject-vehicle positioning attitude from the measurement result of the sensor 5 and the feature matching result of the feature matching portion 12. The low-precision section detection portion 14 detects a section causing the low accuracy of estimating subject-vehicle positioning attitudes from the subject-vehicle positioning attitude estimated by the self-position estimation portion 13. The self-map generation portion 15 generates the self-generated map 4 for the section causing the low accuracy of estimating subject-vehicle positioning attitudes from the past feature data 3 and the subject-vehicle positioning attitude estimated by the self-position estimation portion 13 (FIG. 1). The use of the self-generated map 4 makes it possible to highly accurately estimate subject-vehicle positioning attitudes on the high-precision map including information such as lane centerlines, stop lines, and traffic rules without the use of leading vehicles driven by drivers or expensive high-precision GNSS receivers.

(2) When a large temporal change occurs at the subject vehicle position on the high-precision map 2, the low-precision section detection portion 14 detects the section before the position causing the large temporal change as a section causing the low accuracy of estimating subject-vehicle positioning attitudes based on the subject-vehicle positioning attitude estimated by the self-position estimation portion 13 (FIG. 8). Therefore, the simple process can detect a section causing the low accuracy of estimating subject-vehicle positioning attitudes.

Figure 9:
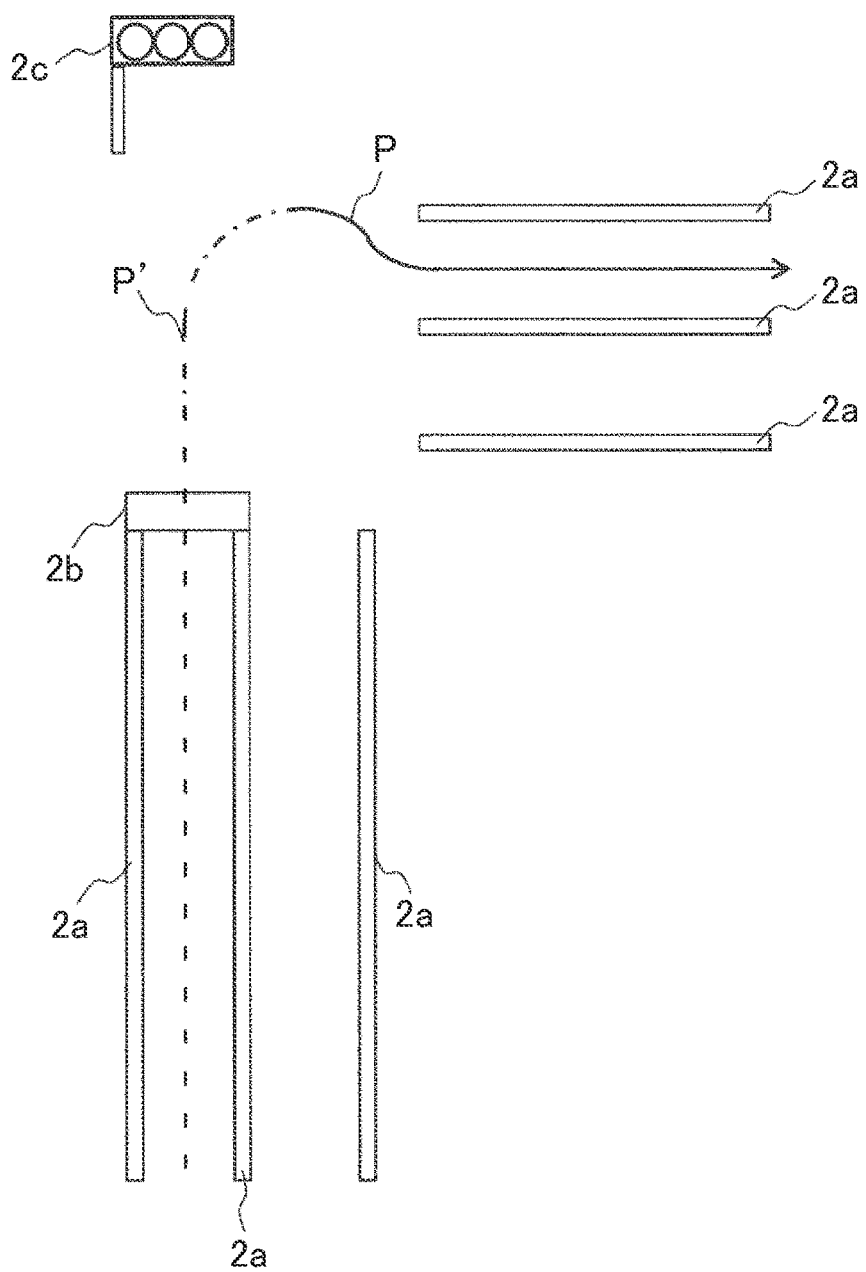
FIG. 9 illustrates an estimated subject-vehicle positioning attitude in the past.

(3) The self-map generation portion 15 generates the self-generated map 4 only in the section that was detected by the low-precision section detection portion 14 and caused the low accuracy of estimating subject-vehicle positioning attitudes (FIG. 9). Therefore, it is possible to reduce processing loads and the usage of storage areas.

(4) The self-map generation portion 15 operates at the timing to reduce the processing load and generates the self-generated map 4. Processing more data than real-time processing makes it possible to highly accurately estimate subject-vehicle positioning attitudes in the past and increase the accuracy of the self-generated map 4. Therefore, it is possible to highly accurately estimate subject-vehicle positioning attitudes.

(5) The feature detection portion 11 detects objects not included in the high-precision map 2 (FIG. 4A, FIG. 4B, FIG. 5). The self-map generation portion 15 saves an object detected by the feature detection portion 11 as the self-generated map 4 based on the estimated past subject vehicle position P'. The feature matching portion 12 associates the features detected by the feature detection portion 11 with the features contained in the self-generated map 4. The self-position estimation portion 13 estimates a subject-vehicle positioning attitude from the measurement result of the sensor 5 and the feature matching result of the feature matching portion 12. Therefore, the use of information on objects not contained in the high-precision map 2 makes it possible to estimate subject-vehicle positioning attitudes more highly accurately than subject vehicle position estimation techniques based solely on matching with the high-precision map.

(6) The feature matching portion 12 determines whether to use an object for the association according to each object type, based on the type of the object detected by the feature detection portion 11 and the date and time to have generated the self-generated map 4 (FIG. 7). The estimation of subject-vehicle positioning attitudes uses even an object such as a tree causing a large temporal change if a short time has elapsed since the generation of the self-generated map 4. It is possible to increase the amount of information available for estimating subject-vehicle positioning attitudes and more highly accurately estimate the subject-vehicle positioning attitudes.

Second Embodiment

The description below explains the self-driving system according to the second embodiment of the present invention by reference to FIGS. 10 and 11. The following description uses the same reference numerals for the same components as in the first embodiment and mainly explains differences. Undescribed points are the same as those in the first embodiment. The present embodiment is targeted at a self-driving system 7 using the self-position estimation device 1.

Block Configuration

Figure 10:
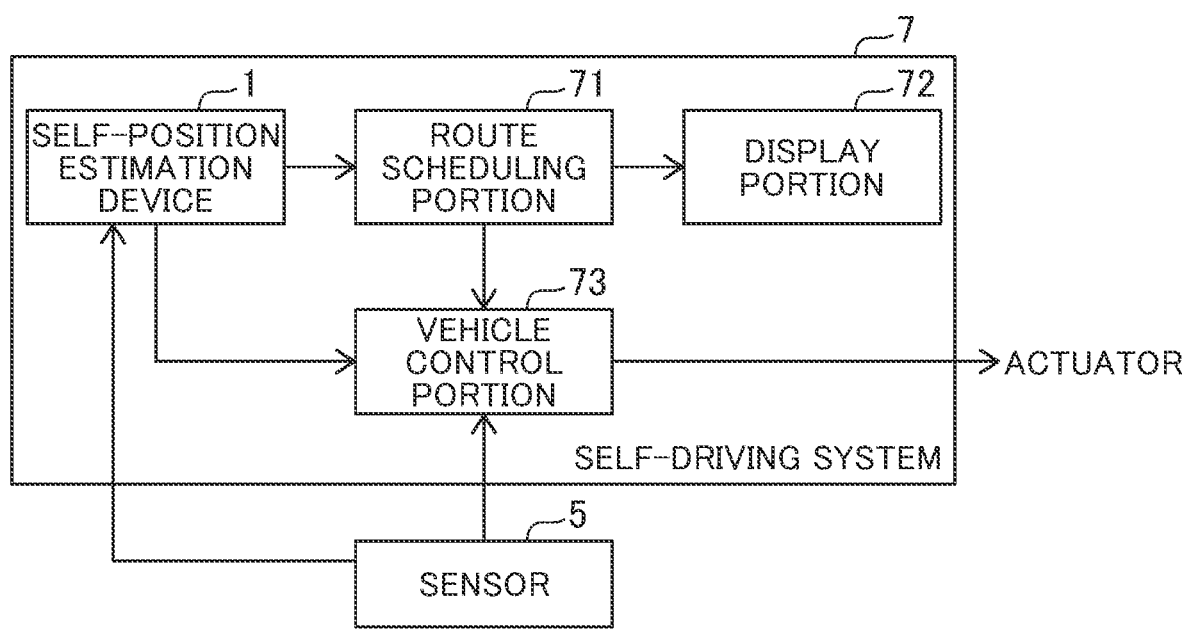
FIG. 10 is a block diagram illustrating the self-driving system according to a second embodiment using the self-position estimation device.

FIG. 10 is a block diagram illustrating the self-driving system 7 of the present embodiment mounted on subject vehicle $V_0$. As illustrated in the drawing, the self-driving system 7 includes the self-position estimation device 1, the route scheduling portion 71, the display portion 72, and the vehicle control portion 73, described in the first embodiment. The self-position estimation device 1, the route scheduling portion 71, and the vehicle control portion 73 may be embodied as one calculator referred to as an ECU (Electronic Control Unit) mounted on the vehicle.

As described in the first embodiment, the self-position estimation device 1 estimates subject-vehicle positioning attitude x on the high-precision map 2 without using an expensive high-precision GNSS receiver. Contrastingly, the route scheduling portion 71 schedules route R from the current position to target position G based on outputs of the self-position estimation device 1, the high-precision map 2, and target position G input by a user. A display portion 72 displays route R scheduled by the route scheduling portion 71 to the user. The sensor 5 measures the states around and inside subject vehicle $V_0$ and supplies outputs to the self-position estimation device 1 and the vehicle control portion 73. The vehicle control portion 73 determines the speed or the steering amount of subject vehicle $V_0$ based on the subject-vehicle positioning attitude estimated by the self-position estimation device 1, route R scheduled by the route scheduling portion 71, and the measurement result of the sensor 5 and supplies outputs to an actuator of subject vehicle $V_0$. Automated driving of subject vehicle $V_0$ is then available.

Operations of the Route Scheduling Portion

The description below explains the contents of processes in the route scheduling portion 71 through the use of FIG. 11. The route scheduling portion 71 schedules route R from the current position to target position G based on output from the self-position estimation device 1, the high-precision map 2, and target position G input by the user.

Figure 11:
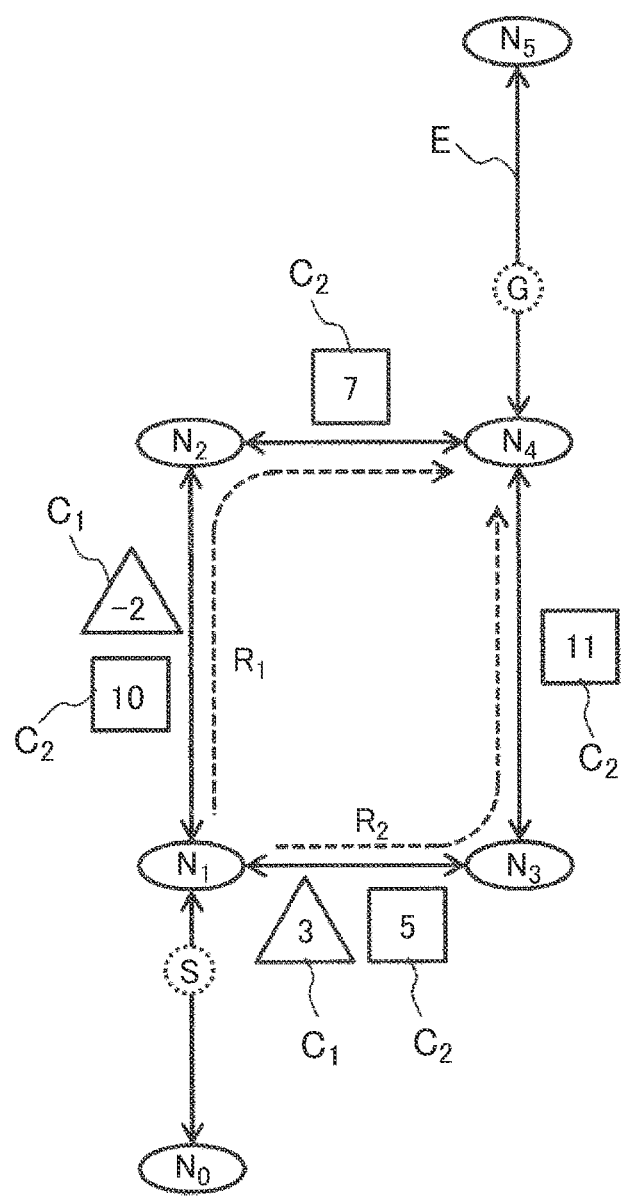
FIG. 11 illustrates operations of a route scheduling portion according to the second embodiment.

FIG. 11 is a diagram illustrating operations of the route scheduling portion 71. The route scheduling portion 71 needs to reference a wide range of information. Therefore, the high-precision map 2 is simply represented by node N and edge E. Node N represents a branch of the road such as an intersection. Edge E represents a road connecting nodes N and is given transit costs $C_1$ (numbers in triangular frames in FIG. 11) based on the output from the self-position estimation device 1 in addition to transit costs $C_2$ (numbers in square frames in FIG. 11) based on the information contained in the high-precision map 2. Current position P is estimated by self-position estimation device 1. Target position G is entered by the user.

For example, transit cost $C_1$ based on the output from the self-position estimation device 1 may be set to be high for the low-precision section detected by the low-precision section detection portion 14. Specifically, transit cost $C_1$ increases according to an increase in the difference (the distance Δ illustrated in FIG. 8) between subject vehicle positions P at time $t_2$ and time $t_1$ used to detect the low-precision section. For example, transit cost $C_1$ based on the output from the self-position estimation device 1 may be determined based on the result from the self-position estimation portion 13 during the past travel. Specifically, when a large residual error results from equation 1 or equation 2 described above, the accuracy of subject-vehicle positioning attitude x is assumed to be low and transit cost $C_1$ is increased. When a small residual error results from equation 1 or equation 2, the accuracy of subject-vehicle positioning attitude x is assumed to be high and transit cost $C_1$ is decreased. Transit cost $C_1$ is not given to edge E not traveled in the past.

The route scheduling portion 71 uses a known route planning method such as Dijkstra's algorithm to schedule route R minimizing the total transit cost based on the information from the high-precision map 2, current position S, and target position G. A conventional route planning technique takes into account only transit cost $C_2$ based on the information contained in the high-precision map 2. Therefore, according to the example in FIG. 11, route $R_2$ is selected to pass through nodes $N_1$, $N_3$, and $N_4$ where the total transit cost further decreases. Contrastingly, the route scheduling portion 71 according to the present embodiment takes into account transit cost $C_1$ based on the output from the self-position estimation device 1 in addition to transit cost $C_2$ based on the information contained in the high-precision map 2. Therefore, route $R_1$ is selected to pass through nodes $N_1$, $N_2$, and $N_4$ where the total transit cost further decreases.

Operations of the Display Portion

The display portion 72 provides the user with the display of route R scheduled by the route scheduling portion 71. Like a normal car navigation system, the display portion 72 provides the user with the display of route R scheduled by the route scheduling portion 71 through the use of a screen, for example. Route R calculated by the route scheduling portion 71 may differ from route $R_2$ calculated only from transit cost $C_2$ based on the information contained in the high-precision map 2. In this case, colors, letters, and other presentation means are used to visually notify the user that route $R_1$ is scheduled in consideration of transit cost $C_1$ based on the output from the self-position estimation device 1.

Operations of the Vehicle Control Portion 73

The vehicle control portion 73 determines the speed or the steering amount of subject vehicle $V_0$ based on subject-vehicle positioning attitude x estimated by the self-position estimation device 1, route R scheduled by the route scheduling portion 71, and the measurement result from the sensor 5 and outputs the speed or the steering amount to the actuator for controlling it.

A known control technique can be used to determine the speed or the steering amount of subject vehicle $V_0$ based on path R and the measurement result of sensor 5. The vehicle control portion 73 determines the speed or the steering amount based on the output from the self-position estimation device 1 in addition to the known technique. Specifically, the speed or the steering amount is set less than in normal traveling in the case of traveling over the low-precision section detected by the low-precision section detection portion 14. The speed or the steering amount is set less than in normal traveling in the case of traveling over a section where the self-generated map 4 is unavailable because the accuracy of the subject-vehicle positioning attitude may decrease.

Effects

The above-described second embodiment can provide the following effects.

(1) The route scheduling portion 71 schedules a route based on both transit cost $C_2$ based on the information contained in the high-precision map 2 and transit cost $C_1$ based on the output from the self-position estimation device 1 (FIG. 10). Transit cost $C_1$ is set to a large value for a low-precision section detected by the detection portion 14 or a section causing low accuracy of estimating the subject-vehicle positioning attitude estimated by the self-position estimation portion 13. Therefore, it is possible to provide smoother automated driving by selecting path R ensuring the high estimation accuracy of subject-vehicle positioning attitude x estimated by the self-position estimation device 1.

(2) Route R calculated by the route scheduling portion 71 may differ from route $R_2$ calculated only from transit cost $C_2$ based on the information contained in the high-precision map 2. In this case, the display portion 72 uses colors, letters, and other presentation means to visually notify the user that route R is scheduled in consideration of transit cost $C_1$ based on the output from the self-position estimation device 1. When the route differs from that proposed by the normal car navigation system, it is possible to relieve the user's concern by providing the user with the reason.

(3) The vehicle control portion 73 determines the speed or the steering amount based on the output from the self-position estimation device 1. The vehicle control portion 73 sets the speed or the steering amount to be less than in normal traveling in the case of traveling over a low-precision section detected by the low-precision section detection portion 14 or a section where the self-generated map 4 is unavailable. Even if the accuracy of estimating the subject-vehicle positioning attitude degrades, the decreased speed or steering amount can ensure smooth automated driving. The decreased speed or steering amount enables the self-map generation portion 15 to more highly accurately estimate relative position attitudes from the past feature data 3. It is possible to generate the highly accurate self-generated map 4.

Third Embodiment

The description below explains a self-generated map sharing device and a self-generated map sharing system according to the third embodiment of the present invention by reference to FIG. 12. The following description uses the same reference numerals for the same components as in the above-described embodiments and mainly explains differences. Undescribed points are the same as those in the above-described embodiments. The present embodiment is targeted at the self-generated map sharing system. In this system, each of multiple vehicles is mounted with a self-position estimation device with the communication function 8 additionally including the function to transmit and receive the self-generated map 4 from the self-position estimation device 1 and a self-generated map sharing device 9 that integrates the self-generated map 4 transmitted from the self-position estimation device with the communication function 8 mounted on each vehicle and manages it as a shared self-generated map 4a.

Block Configuration

Figure 12:
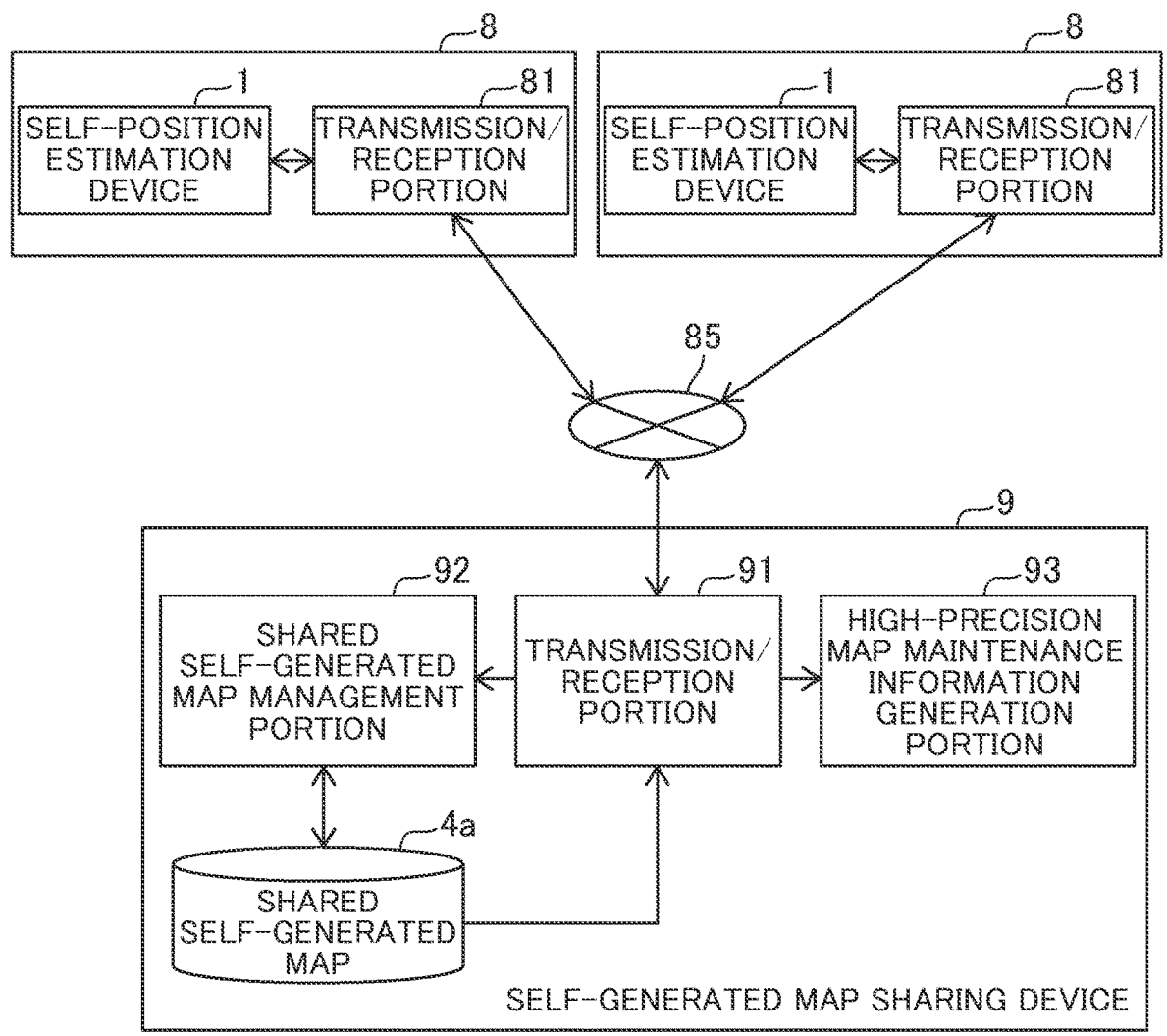
FIG. 12 is a block diagram illustrating a self-position estimation device with a communication function and a self-generated map sharing device according to a third embodiment.

FIG. 12 is a block diagram illustrating the self-generated map sharing system according to the present embodiment. As illustrated in the drawing, the self-generated map sharing system connects multiple self-position estimation devices with the communication function 8 and the self-generated map sharing device 9 via a network 85.

The self-position estimation device with the communication function 8 includes the self-position estimation device 1 described in the first embodiment and a transmission/reception portion 81 and is installed in each vehicle.

The self-generated map sharing device 9 includes a transmission/reception portion 91, a shared self-generated map management portion 92, and a high-precision map maintenance information generation portion 93 and maintains the shared self-generated map 4a described later. The self-generated map sharing device 9 is installed in a server, for example.

In the self-generated map sharing system configured above, the self-position estimation device with the communication function 8 transmits the self-generated map 4 generated by the self-position estimation device 1 to the self-generated map sharing device 9 via the network 85. The self-position estimation device with the communication function 8 receives the shared self-generated map 4a from the self-generated map sharing device 9 via the network 85 and saves the shared self-generated map 4a as the self-generated map 4 in the self-position estimation device 1.

The transmission/reception portion 91 of the self-generated map sharing device 9 receives the self-generated map 4 from the self-position estimation device with the communication function 8 via the network 85 and outputs the self-generated map 4 to the shared self-generated map management portion 92 and the high-precision map maintenance information generation portion 93. The transmission/reception portion 91 transmits the shared self-generated map 4a to the self-position estimation device with the communication function 8 via the network 85.

The shared self-generated map management portion 92 integrates the self-generated maps 4 received from the multiple self-position estimation devices with the communication function 8 to generate the shared self-generated map 4a. The details of the process will be described later.

The high-precision map maintenance information generation portion 93 generates information used for the maintenance of the high-precision map 2 from the self-generated maps 4 received via the network 85. The details of the process will be described later.

Operations of the Shared Self-Generated Map Management Portion 92

The shared self-generated map management portion 92 integrates the received self-generated maps 4 to generate the shared self-generated map 4a. Specifically, when the self-generated maps 4 contain the same type of objects indicating the distances smaller than or equal to a threshold, the shared self-generated map management portion 92 saves the objects as one object in the shared self-generated map 4a on the assumption that the three-dimensional position is an average of the three-dimensional positions. When objects are contained in the self-generated maps 4 corresponding to a certain area, the shared self-generated map 4a may save only the information contained in the self-generated map 4 indicating the latest measurement date and time.

Operations of the High-Precision Map Maintenance Information Generation Portion

The high-precision map maintenance information generation portion 93 generates information used for maintenance of the high-precision map 2 from the received self-generated maps 4. Specifically, when an object is included in the self-generated maps 4 corresponding to a certain area, the self-position estimation in vehicles is discontinuous. Therefore, it is determined that the high-precision map 2 is short of information or the information contained in the high-precision map 2 is changed. The area is determined to require maintenance such as remeasurement.

Effects

The above-described third embodiment can provide the following effects.

(1) The self-position estimation device with the communication function 8 includes the transmission/reception portion 81. The self-generated map sharing device 9 includes the transmission/reception portion 91 and the shared self-generated map management portion 92. The shared self-generated map management portion 92 integrates the received self-generated maps 4 to generate the shared self-generated map 4a. Therefore, by using the shared self-generated map 4a, the self-position estimation device with the communication function 8 can highly accurately estimate subject-vehicle positioning attitudes. Reception of the shared self-generated map 4a makes it possible to reference the self-generated map 4 even in places where subject vehicle $V_0$ has never traveled in the past. It is possible to highly accurately estimate subject-vehicle positioning attitudes.

(2) When the self-generated maps 4 contain the same type of objects indicating the distances smaller than or equal to a threshold, the shared self-generated map management portion 92 saves the objects as one object in the shared self-generated map 4a on the assumption that the three-dimensional position is an average of the three-dimensional positions. The accuracy of the self-generated map 4 improves, making it possible to highly accurately estimate subject-vehicle positioning attitudes.

(3) When the self-generated maps 4 contain objects in tams of a certain area on the high-precision map 2, the shared self-generated map management portion 92 allows the shared self-generated map 4a to save an object contained in the self-generated map 4 indicating the latest measurement date and time. The use of the latest self-generated map 4 makes it possible to highly accurately estimate subject-vehicle positioning attitudes even when the environment changes.

(4) The high-precision map maintenance information generation portion 93 detects an area corresponding to the high-precision map 2 short of information or an area corresponding to the high-precision map 2 containing changed information from the self-generated maps 4 received from the self-position estimation devices with the communication function 8. Therefore, it is possible to efficiently maintain the high-precision map 2.

Modifications of the Third Embodiment

The above-described self-generated map sharing system transmits and receives the self-generated map 4 via the network 85. However, data transmitted and received between the self-position estimation device with the communication function 8 and the self-generated map sharing device 9 is not limited thereto.

For example, the self-position estimation device with the communication function 8 may transmit a low-precision section detected by the low-precision section detection portion 14, and the self-generated map sharing device 9 may receive it. In this case, the high-precision map maintenance information generation portion 93 may receive information from the self-position estimation devices with the communication function 8 to notify that the relevant section is a low-precision section in terms of a certain area on the high-precision map 2. Then, it is determined that the high-precision map 2 is short of information or the information contained in the high-precision map 2 is changed. The area is determined to require maintenance such as remeasurement.

This modification provides the following operations and effects. The self-position estimation device with the communication function 8 and the self-generated map sharing device 9 transmit and receive only the low-precision section detected by the low-precision section detection portion 14. Therefore, it is possible to efficiently maintain the high-precision map 2 under low traffic conditions.

The present invention is not limited to the above-described embodiments and includes various modifications. For example, the above-mentioned embodiments are described in detail to explain the invention in an easy-to-understand manner. The invention is not necessarily limited to the whole of all the configurations described. The scope of the invention also includes other aspects conceivable within the scope of the technical idea of the invention. It is possible to replace part of the configuration of one embodiment with the configuration of another embodiment. It is also possible to add the configuration of one embodiment to the configuration of another embodiment. Part of the configuration of each embodiment can be subject to the addition, deletion, or replacement of other configurations. Part or all of the above-described configurations, functions, processing portions, and processing means, for example, may be embodied as hardware by designing integrated circuits, for example. The above-described configurations and functions, for example, may be embodied as software by allowing the processor to interpret and execute programs that provide the functions. Information such as programs, tables, and files to embody the functions can be stored in recording devices such as memory, hard disks, and SSD (Solid State Drive), or recording media such as IC cards, SD cards, and DVDs.

LIST OF REFERENCE SIGNS

1 . . . self-position estimation device, 11 . . . feature detection portion, 12 . . . feature matching portion, 13 . . . self-position estimation portion, 14 . . . low-precision section detection portion, 15 . . . self-map generation portion, 2 . . . high-precision map, 3 . . . past feature data, 4 . . . self-generated map, 5 . . . sensor, 4a . . . shared self-generated map, 7 . . . self-driving system, 71 . . . route scheduling portion, 72 . . . display portion, 73 . . . vehicle control portion, 8 . . . self-position estimation device with the communication function, 81 . . . transmission/reception portion, 9 . . . self-generated map sharing device, 91 . . . transmission/reception portion, 92 . . . shared self-generated map management portion, 93 . . . high-precision map maintenance information generation portion

The invention claimed is:

1. A self-driving system for improving accuracy in estimating a location of a vehicle in which the self-driving system is located, the self-driving system comprising:
   a memory; and
   a processor communicatively coupled to the memory,
   wherein the processor is configured to:
   receive measurement results of a sensor configured to measure objects around the vehicle;
   estimate a self-location and attitude on a high-precision map from the measurement results in three-dimensional space, wherein the high-precision map includes a plurality of information regarding at least an environment surrounding the vehicle;
   detect a low-precision section indicating low estimation accuracy based on the self-location and attitude, wherein the low-precision section is detected when a distance of the vehicle at two different positions at two different times is greater than or equal to a predetermined threshold;

generate a self-generated map saving a position and type of at least one of the objects on the high-precision map in the low-precision section only, estimate the location of the vehicle using the self-generated map, calculate costs of a plurality of routes, including a first route which includes the low-precision section, using a calculation wherein cost increases according to an increase in the distance used to detect the low-precision section, and schedule a route having a minimum cost from a current position to a target position based on the self-location and attitude, the high-precision map, the target position entered by a user, and the low-precision section.

2. The self-driving system according to claim 1, wherein the processor is further configured to:

detect a second object from the measurement results of the sensor and save a detection result as past feature data in the memory; and provide a matching result by calculating a matching between the second object and the at least one of the objects included in the self-generated map, estimate a second self-location and attitude on the high-precision map based on the measurement results of the sensor and the matching result; and estimate a past self-location and attitude in the low-precision section and update the self-generated map based on the second self-location and attitude and the past feature data.

3. The self-driving system according to claim 2, wherein the processor detects an other object not included in the high-precision map.

4. The self-driving system according to claim 2, wherein the processor determines whether to use each of the objects around the vehicle for matching with the self-generated map based on a type of the second object detected and a measurement date and time of at least one of the objects included in the self-generated map.

5. The self-driving system according to claim 1, wherein the processor waits to generate the self-generated map at a timing other than a current time.

6. The self-driving system according to claim 1, further comprising: a display configured to display the cost for the scheduled route.

7. The self-driving system according to claim 1 wherein the processor is further configured to:

determine a speed and a steering amount of the vehicle, and provide output to at least one of a plurality of actuators based on the location of the vehicle, the high-precision map, the low-precision section, and the measurement results of the sensor, wherein, when traveling the low-precision section, the processor controls one of the plurality of actuators so that the speed is set less than in normal traveling or a different one of the plurality of actuators so that the steering amount is set less than in normal traveling.

8. The self-driving system according to claim 1 wherein the processor is further configured to:

determine a speed and a steering amount of the vehicle, and provide output to at least one of a plurality of actuators based on the location of the vehicle, the high-precision map, the self-generated map, and the measurement results of the sensor, wherein, when traveling a section devoid of the self-generated map, the processor controls one of the plurality of actuators so that the speed is set less than in normal traveling or a different one of the plurality of actuators so that the steering amount is set less than in normal traveling.

9. The self-driving system according to claim 1, wherein the high-precision map includes traffic rules for the location of the vehicle.

10. A self-generated map sharing system comprising:

a plurality of vehicles each mounted with the self-driving system according to claim 1, a transmitter/receiver that acquires a plurality of the self-generated maps from the plurality of vehicles; and a server that integrates the plurality of the self-generated maps to generate a shared self-generated map.

11. The self-generated map sharing system according to claim 10, wherein, when at least two of the plurality of the self-generated maps contains a plurality of a same classification of the objects having a distance from each other on the high-precision map that is smaller than or equal to a threshold, the server saves the plurality of the same classification of the objects as one object in the shared self-generated map.

12. The self-generated map sharing system according to claim 10, wherein, when at least two of the plurality of the self-generated maps contains a second object of the objects in a certain area on the high-precision map, the server saves in the self-generated map the second object which has a latest measurement date and time.

13. The self-generated map sharing system according to claim 10, wherein the server is further configured to:

determine, on a condition that the plurality of the self-generated maps includes an object of the objects included in a certain area on the high-precision map, that the position on the high-precision map is discontinuous and requires maintenance.

14. A self-generated map sharing system comprising:

a server; and a plurality of self-driving systems that are each installed in a respective vehicle;

wherein each of the plurality of the self-driving systems improves accuracy in estimating a location of the respective vehicle and includes a processor configured to:

receive measurement results of a sensor configured to measure objects around the respective vehicle, estimate a self-location and attitude on a high-precision map from the measurement results in three-dimensional space, wherein the high-precision map includes a plurality of information regarding at least an environment surrounding the respective vehicle, detect a low-precision section of the plurality of low-precision sections indicating low estimation accuracy based on the self-location and attitude, wherein the low-precision section is detected when a distance of the respective vehicle at two different positions at two different times is greater than or equal to a predetermined threshold, generate a self-generated map saving a position and type of at least one of the objects on the high-precision map in the low-precision section only, estimate the location of the respective vehicle using the self-generated map, calculate costs of a plurality of routes, including a first route which includes the low-precision section, using a calculation wherein cost increases according to an increase in the distance used to detect the low-precision section, schedule a route having a minimum cost from a current position to a target position based on the self-location and attitude, the high-precision map, the target position entered by a user, and the low-precision section, and transmit the self-generated map to the server; and wherein the server is configured to:

generate a shared self-generated map based on the self-generated map received from the plurality of the self-driving systems, and transmit the shared self-generated map to each of the plurality of the self-driving systems.

15. The self-generated map sharing system of claim 14, wherein the server is further configured to:

determine that maintenance is required for a certain area on the high-precision map based on the self-generated map received from at least one of the plurality of the self-driving systems.

16. The self-generated map sharing system of claim 14, wherein the high-precision map includes traffic rules for a location of the respective vehicle.

* * * * *